(12) United States Patent
Kruys et al.

(10) Patent No.: US 7,764,218 B2
(45) Date of Patent: Jul. 27, 2010

(54) ADAPTIVE SAMPLING OF RADIO FREQUENCY CHANNELS FOR RADAR DETECTION

(75) Inventors: Johannes Kruys, Harmelen (NL); Hari Narayanan Rangarajan, Milpitas, CA (US); Raghuram Rangarajan, Santa Clara, CA (US); Christopher Meil, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/178,273

(22) Filed: Jul. 23, 2008

(65) Prior Publication Data

US 2010/0019947 A1 Jan. 28, 2010

(51) Int. Cl.
*G01S 7/40* (2006.01)
*G01S 7/285* (2006.01)
*G01S 7/02* (2006.01)
*G01S 13/00* (2006.01)

(52) U.S. Cl. .......................... 342/20; 342/13; 342/165; 342/173; 342/175; 342/195

(58) Field of Classification Search ............. 342/13–20, 342/89–103, 165, 173, 175, 192–197; 455/150.1, 455/161.1–169.2
See application file for complete search history.

(56) References Cited

U.S. PATENT DOCUMENTS

| | | | | | |
|---|---|---|---|---|---|
| 2,862,204 | A | * | 11/1958 | Henrici et al. ................. | 342/20 |
| 3,077,601 | A | * | 2/1963 | Newhouse .................... | 342/20 |
| 3,660,844 | A | * | 5/1972 | Potter ........................... | 342/20 |
| 3,689,922 | A | * | 9/1972 | Phillips, Jr. ................... | 342/93 |
| 3,921,171 | A | * | 11/1975 | Strother et al. ................ | 342/16 |
| 3,922,676 | A | * | 11/1975 | O'Berry et al. ............... | 342/13 |
| 4,025,920 | A | * | 5/1977 | Reitboeck et al. ............. | 342/13 |
| 4,028,708 | A | * | 6/1977 | Woodward .................... | 342/16 |
| 4,301,454 | A | * | 11/1981 | Bailey ........................... | 342/13 |
| 4,700,191 | A | * | 10/1987 | Manor .......................... | 342/13 |
| 4,860,013 | A | * | 8/1989 | Huntley ........................ | 342/20 |
| 4,887,086 | A | * | 12/1989 | Unser et al. ................... | 342/20 |
| 4,956,644 | A | * | 9/1990 | Leahy et al. .................. | 342/20 |
| 5,285,209 | A | * | 2/1994 | Sharpin et al. ................ | 342/13 |
| 5,497,161 | A | * | 3/1996 | Tsui ............................. | 342/192 |
| 5,661,485 | A | * | 8/1997 | Manuel ........................ | 342/13 |
| 6,043,771 | A | * | 3/2000 | Clark et al. ................... | 342/13 |
| 6,448,921 | B1 | * | 9/2002 | Tsui et al. ..................... | 342/13 |
| 7,295,145 | B2 | * | 11/2007 | Weber .......................... | 342/16 |
| 2006/0017604 | A1 | * | 1/2006 | Weber .......................... | 342/16 |

* cited by examiner

*Primary Examiner*—Bernarr E Gregory

(57) ABSTRACT

Described in an example embodiment herein is a procedure that comprises sampling one or more channels that are not in use for a short time at certain intervals. In particular embodiments, the interval duration is irregular so as to prevent "out of step" lock with a radar's pulses. During the sampling period, detection events are stored in terms of start time and duration. If potential radar events are detected, the channels are sampled for a longer, second interval to determine whether the detection events are indicative of radar. The length of the sampling period determines the number of samples needed to get an acceptable detection probability.

21 Claims, 4 Drawing Sheets

ADAPTIVE SAMPLING OF RADIO FREQUENCY CHANNELS FOR RADAR DETECTION

TECHNICAL FIELD

The present disclosure relates generally to detecting radar signals.

BACKGROUND

Operations on certain radio frequencies, such as the 5 GHz band, require radar detection capabilities because radar may be present on these bands. A channel can be used as long as radar is not detected. Presently, contiguous checks of 60 seconds (or 10 minutes for the radar sub-band) have been implemented. These checks are very disruptive to normal Wireless Local Area Network (WLAN) traffic.

BRIEF DESCRIPTION OF THE DRAWINGS

The accompanying drawings incorporated herein and forming a part of the specification illustrate the example embodiments.

BRIEF SUMMARY OF THE INVENTION

Figure 1:
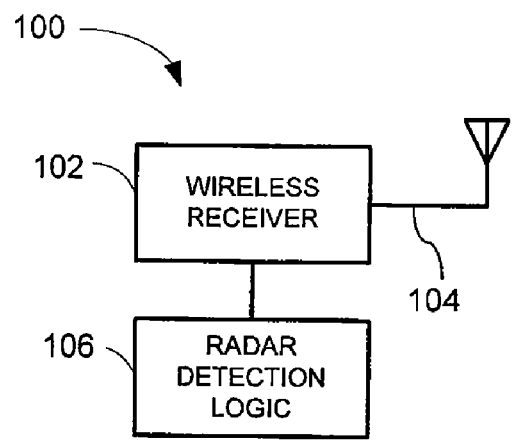
FIG. 1 illustrates an example of a device configured for adaptive sampling of radio frequency channels for radar detection.

The following presents a simplified overview of the example embodiments in order to provide a basic understanding of some aspects of the example embodiments. This overview is not an extensive overview of the example embodiments. It is intended to neither identify key or critical elements of the example embodiments nor to delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver and radar detection logic coupled to the wireless transceiver. The radar detection logic is configured to switch the wireless transceiver from a first channel to a second channel after a predetermined interval. The radar detection logic is further configured to have the wireless transceiver dwell on the second channel a first predetermined time period to detect energy events on the second channel and then to switch the wireless transceiver to the first channel. The radar detection logic is configured to switch the wireless transceiver to the second channel to dwell on the second channel for a second predetermined time period responsive to detecting energy events that are potential radar signals during the first predetermined time period.

In accordance with an example embodiment, there is disclosed herein a method comprising operating on a first frequency, switching to a second frequency after a predetermined interval, and monitoring the second frequency a first time period. The method further comprises monitoring the second frequency a second time period responsive to detecting a potential radar event while monitoring the second frequency the first time period, wherein the second time period is greater than the first time period.

DETAILED DESCRIPTION OF THE INVENTION

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a procedure that comprises sampling one or more channels that are not in use for a short time at certain intervals. In particular embodiments, the interval duration is irregular to prevent "out of step" lock with a radar's pulses. During the sampling period, detection events are stored in terms of start time and duration. The length of the sampling period determines the number of samples needed to get an acceptable detection probability, e.g. 90% or more.

Sampling takes place in two types of sample periods, referred to herein as "basic peek" and "extended peek." If nothing is detected during basic peek, the event buffer is cleared, and the channel is ignored until another basic peek is performed. If events collected during a basic peek contain any repeating interval, the basic peek is extended into an extended peek so as to allow for detection of more such events. If no more events are detected, the first events are considered abnormal events (for example, non-radar signals such as noise or packet collisions); otherwise radar has been detected, and the channel is marked as unavailable for use. The criteria for entering the extended peek period can be adapted to the radio frequency (RF) environment and the detector characteristics. For example, if the extended peek periods are long compared to the average packet interval, the AP can send a radio management message, telling its peers or clients it will be off-line for some period of time, e.g. some milliseconds. With a good RF detector—which has a low false rate—this scheme makes it possible to detect radars reliably while using only a small fraction of the AP's time. QoS and throughput are not affected significantly.

In an example embodiment, the scheme is adaptive in that its parameters (peek period, extended peek period, and average peek interval) can be matched to traffic conditions; for example, more traffic means less time available to detect radar on another channel and, therefore, detection may take more time. The ratio between detection time and interval and detection probability can be easily determined, and this allows an implementation to adapt its radar off channel monitoring to current traffic conditions.

FIG. 1 illustrates an example of a device 100 configured for adaptive sampling of radio frequency (RF) channels (frequencies) for radar detection. Device 100 comprises a wireless transceiver 102 coupled to antenna 104 and radar detection logic 106 coupled to wireless transceiver 102. "Logic," as used herein, includes but is not limited to hardware, firmware, software, and/or combinations of each to perform a function(s) or an action(s), and/or to cause a function or action from another component. For example, based on a desired application or need, logic may include a software-controlled microprocessor, discrete logic such as an application-specific integrated circuit (ASIC), a programmable/programmed logic device, memory device containing instructions, or the like, or combinational logic embodied in hardware. Logic may also be fully embodied as software.

Radar detection logic 106 is configured to switch wireless transceiver 102 from a first channel to a second channel after a predetermined interval. Radar detection logic 106 is configured to have wireless transceiver 102 dwell on the second channel a first predetermined time period to detect energy events on the second channel and then to switch wireless transceiver 106 back to the first channel. Radar detection logic 106 is further configured to switch wireless transceiver 102 to the second channel to dwell on the second channel for a second predetermined time period responsive to detecting energy events that are potential radar signals during the first predetermined time period. In an example embodiment, the second time period is longer than the first time period.

In an example embodiment, radar detection logic 106 is configured to determine that the second channel is unavailable due to the presence of radar responsive to detecting a predetermined number of pulses during the second predetermined time period. In particular embodiments, radar protection logic 106 determines that wireless transceiver 106 should dwell on the second channel responsive to observing a number of predetermined pulses during the first time period. For example, let n represent the number of pulses for radar detection. During the first time period, wireless transceiver 102 dwells on the second channel for a short period of time. If a number of pulses, m, are observed, where m<n, then radar detection logic 106 has wireless transceiver 102 dwell on the second channel for a second time period, which is longer than the first time period. If n or more pulses are observed during the second time period, then radar detection logic 106 determines a radar is operating on the second frequency. For example, n can be equal to six and m equal to three, so if at least three pulses are detected during the first time period, radar detection logic 106 has wireless transceiver 102 dwell on the second frequency for a second time period. If at least six pulses are observed during the second time period, then radar detection logic 106 determines radar is present.

In other example embodiments, the time periods or number of pulses may vary. For example, radar detection logic 106 may determine radar is present if the sum of the pulses detected in both time periods is greater than a threshold number (e.g. m+n>t, where m is pulses detected in the first time period, n is the number of pulses detected in the second time period, and t is a predetermined threshold number of pulses). For example, shorter time periods may be used if a channel is known to be relatively free of noise sources. In example embodiments, the first time period is equal to the second time period; in other example embodiments, the first time period is greater than the second time period; and in still yet other example embodiments, the second time period is longer than the first time period. In an example embodiment, radar detection logic 106 has wireless transceiver 102 scan a plurality of channels for the first time period and then returns to channels on which potential radar events were detected to dwell for the second time periods. In other embodiments, radar detection logic 106 may have wireless transceiver 102 remain on a channel for the second time period responsive to detecting potential radar events during the first time period.

An aspect of an example embodiment is that the predetermined interval, first and second time periods, and threshold number of pulses for the first and second time periods are all configurable. In addition, by searching for a smaller number of pulses during the first interval enables radar signals to be detected for n pulses using dwell times for the first time period less than the threshold time for detecting n pulses. This results in improved on channel efficiency because of less off channel time for a given detection time period.

Employing two different time periods can alleviate false positives. Detecting a set of pulses during one time period may trigger a false radar detection event. It is unlikely that noise or other non-radar energy events would recur during subsequent time intervals.

In an example embodiment, the predetermined interval and/or dwell times (first and second predetermined time periods) can be varied. This can help detect radars that periodically sweep different angles. For example, if the same time interval and/or dwell time is always used, a possibility exists that the dwell time will always occur when the radar is sweeping in another direction (for example, a rotating radar may be pointing in the opposite direction). In an example embodiment, the predetermined interval varies randomly. The predetermined interval may vary for every cycle or may be varied for a predetermined number of cycles. The amount of time for varying the predetermined interval and/or dwell time may also be variable. For example, the time interval may be varied by a random amount every fourth cycle: e.g., $t_i$, $t_i$, $t_i$, $t_i$,+ random (where random may be either a fixed, variable, or negative number). For example, for a fixed number, random may be equal to one percent of $t_i$. The first predetermined time period may also be varied, e.g. 1 millisecond for a predetermined number of on channel/off channel cycles and 2 milliseconds after the predetermined number of on channel/off channel cycles.

In an example embodiment, radar detection logic 106 transmits a message via the wireless transceiver 102 on the first channel, informing any associated nodes that the wireless transceiver 102 will be off the first channel before switching wireless transceiver 106 to the second channel to dwell on the second channel for the second predetermined time period. For example, the message may be a broadcast message comprising data informing any recipients that wireless transceiver 102 will be off the first channel for x milliseconds. Optionally, radar detection logic 106 may transmit a message via wireless transceiver 102 on the first channel after returning to the first channel after dwelling on the second channel for the second predetermined time period. For example, the first message may simply state "off channel" and, after the second dwell on the second frequency, the second message may simply state "on channel" or active.

In an example embodiment, radar detection logic 106 is configured to timestamp energy events detected during the first predetermined time period. The energy events may be sorted by timestamp, and radar detection logic 106 can determine by the spacing between energy events whether a predetermined number of repeating energy events (such as pulses) have been detected. For example, if two three energy events are detected, where the spacing between the first energy event and the second energy event is equal to the spacing between the second energy event and the third energy event, then radar logic 106 can determine that three pulses have been detected. If a predetermined number of repeating energy events are detected, e.g. three pulses, radar detection logic 106 is responsive to have wireless transceiver 102 dwell on the second frequency for the second predetermined time period. If a second set of repeating energy events are detected during the second time period, radar detection logic 106 can determine that the second set of energy events are radar signals if more than a second predefined number of repeating energy events are detected. Alternatively, radar detection logic 106 may determine radar signals are present if the sum of repeating energy events for the first and second time periods exceeds a predetermined threshold (for example, 9). Radar detection logic 106 may have wireless transceiver 102 remain on the second channel to dwell for the second time period, or may switch to other channels, such as return to the first channel and optionally transmit a message informing nodes on the first channel that device 100 will be off channel, and return later to dwell for the second time period.

In an example embodiment, the values for the predetermined interval, first time period, and/or second time period are based on a radar signal having the shortest cycle time. This ensures that radars with very small rotation cycles can be effectively detected. Radar signals with longer cycle times can still be detected because there would be multiple scans over each cycle.

Figure 2:
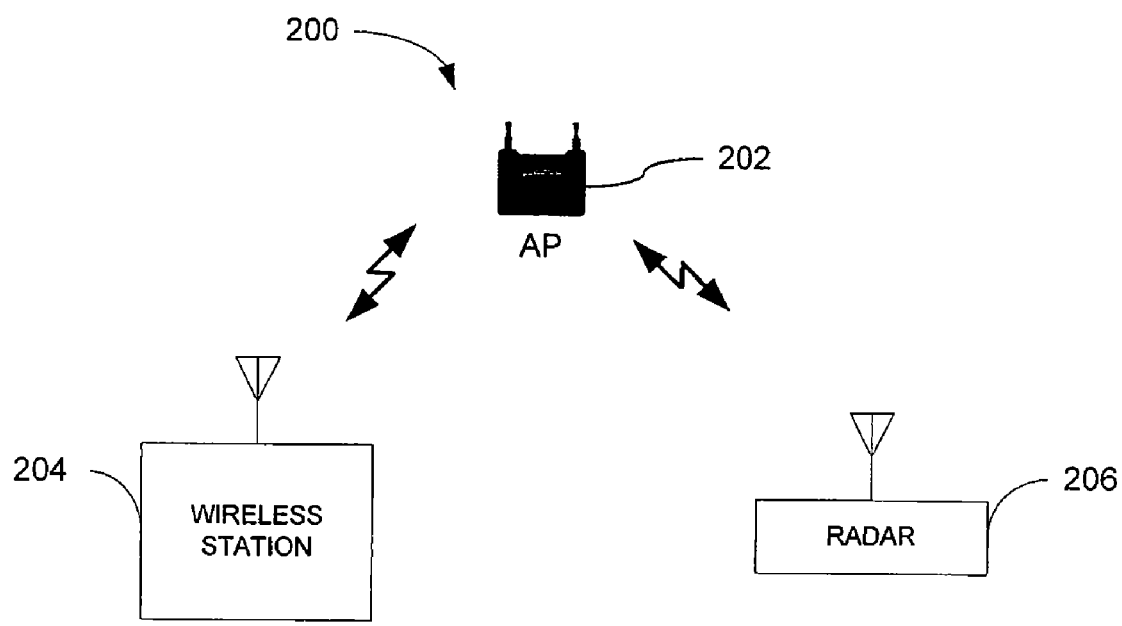
FIG. 2 illustrates an example of a system employing adaptive sampling of radio frequency channels for radar detection.

FIG. 2 illustrates an example of a system 200 having an access point 202 employing adaptive sampling of RF channels for radar detection. Access point 202 comprises a wireless transceiver capable of operating on a plurality of frequencies and radar detection logic, which may be configured as described for radar protection logic 106 in FIG. 1. System 200 also has a wireless station 204, which is in communication with access point 202, and a radar 206, which periodically transmits radar signals.

As one example, access point (AP) 202 and wireless station 204 are operating on a first channel, and radar 206 is operating on a second channel. AP 202 periodically switches its transceiver to the second channel so as to monitor for radar pulses. As described herein, the interval between scans on the second channel and/or the amount of dwell time spent on the second channel may be varied. If AP 202 detects a potential radar event from radar 206 on the second channel, AP 202 then monitors the channel a second time for a second time period. If AP 202 detects signals from radar 206 during the second time period, radar detection logic in AP 202 determines that the second channel is unavailable due to the presence of radar signals.

As another example, AP 202 and wireless station 204 are operating on a first frequency. AP 202 periodically scans the second channel for radar signals. If radar 206 becomes active on the first channel, AP 202 can switch to the second channel (and notify wireless station 204 of the switch) if AP 202 has not detected any potential radar events on the second channel.

Figure 3:
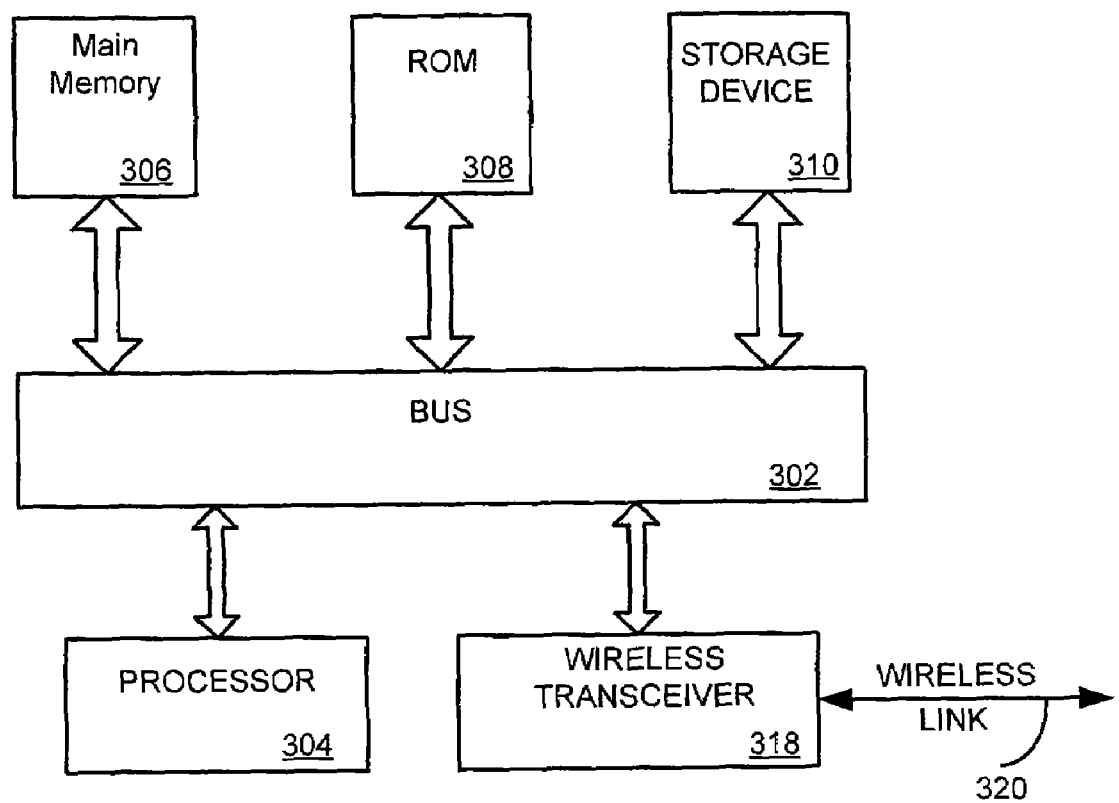
FIG. 3 illustrates an example of a computer system capable of implementing an example embodiment.

FIG. 3 is a block diagram that illustrates a computer system 300, upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for adaptive sampling of RF channels for radar detection. According to an example embodiment, adaptive sampling of RF channels for radar detection is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 304 for execution. Such a medium may take many forms, including but not limited to non-volatile media, volatile media, and transmission media. Non-volatile media include, for example, optical or magnetic disks such as storage device 310. Volatile media include dynamic memory such as main memory 306. Transmission media include coaxial cables, copper wire, and fiber optics, including the wires that comprise bus 302. Transmission media can also take the form of acoustic or light waves such as those generated during radio frequency (RF) and infrared (IR) data communications. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium, from which a computer can read.

Various forms of computer-readable media may be involved in carrying one or more sequences of one or more instructions to processor 304 for execution. For example, the instructions may be initially borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may be optionally stored on storage device 310 either before or after execution by processor 304.

Computer system 300 also includes a wireless transceiver 318 coupled to bus 302. Wireless transceiver 318 provides a two-way data communication, coupling computer system 300 to other wireless devices via wireless link 320. Wireless transceiver 318 is responsive to instructions from processor 304. For example, processor 304 can send instructions to wireless transceiver 318 to switch channels. Signals received via wireless transceiver 318 can be processed by processor 304. This enables processor 304 to detect energy events, which may be potential radar signals, and enables processor 304 to change the operation of wireless transceiver 318 responsive to detecting radar signals.

Figure 4:
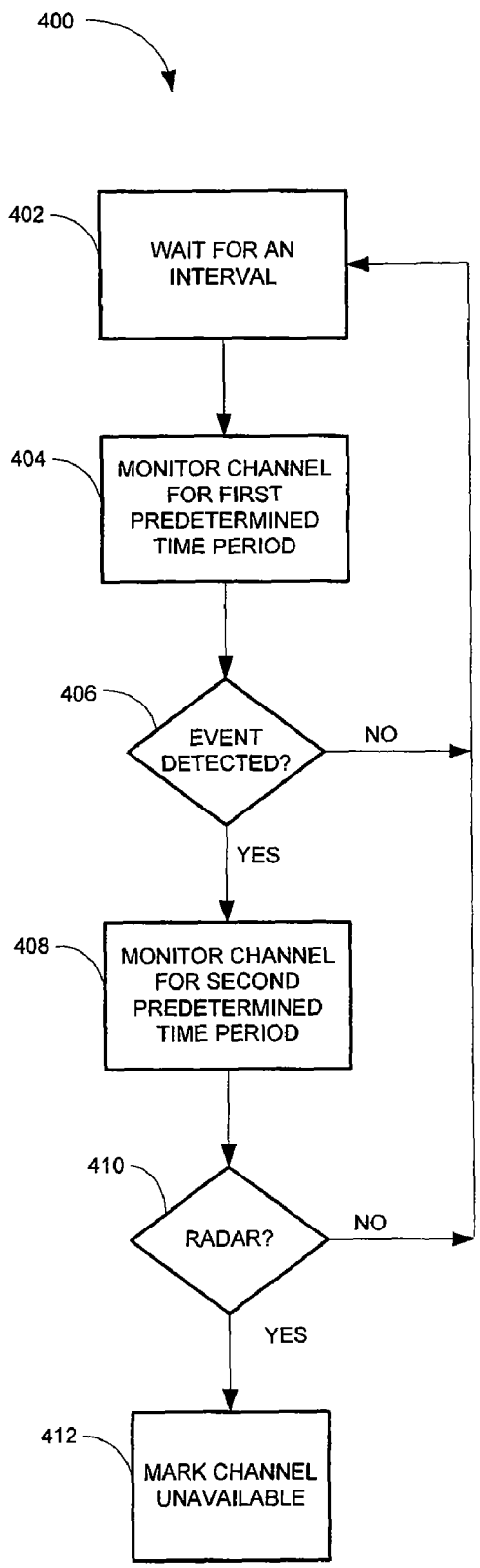
FIG. 4 illustrates an example of a methodology for adaptive sampling of radio frequency channels for radar detection.

In view of the foregoing structural and functional features described above, a methodology in accordance with an example embodiment will be better appreciated with reference to FIG. 4. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement methodology 400 in accordance with an aspect of the example embodiment. Methodology 400 is suitably adapted to be implemented in hardware (for example by radar detection logic 106 in FIG. 1), software, or a combination thereof (for example by processor 304 in FIG. 3 executing the appropriate instructions).

At 402, a wireless transceiver operates on a first frequency for a predetermined interval. The time of the interval may be fixed or periodically randomized, as described herein. For example, every fifth interval may be increased (or decreased) by a predetermined amount (such as 1%, 2%, etc.) or by a random variable amount (such as 1% one time, 10% the next time, 0.5% the next time, etc.). This aids in detecting periodic radar signals (such as rotating radars) by sampling at different times during the cycle.

At 404, the transceiver scans a second frequency for a first time period. The first time period may be a fixed time period or a variable time period. In an example embodiment, the first time period is at least a minimum amount to detect a predetermined number of pulses (for example 3 pulses) from a radar.

At 406, a determination is made as to whether a potential radar event was detected during the first time period. In an example embodiment, this is performed after the transceiver has returned to the first frequency although, in another example embodiment, this may be performed concurrently with the first time period. The determination of the presence of radar may be based upon detecting a predetermined number of repeating pulses (such as 3 or more).

If at 406, a potential radar event is detected (YES) at 408, the second channel is monitored for a second time period. In an example embodiment, a message is transmitted by the wireless transceiver on the first channel, informing recipients that the wireless transceiver will be off channel (or unavailable) during the second time period. In particular embodiments, the second time period is longer than the first period. For example, if the first time period is selected to detect at least three pulses, the second time period can be set long enough detect a minimum number of repeating events (such as pulses) to accurately confirm radar is present (for example, 6 or more pulses).

At 410, a determination is made as to whether radar was detected on the second channel during the second time period. In an example embodiment, radar is determined to be present if a predetermined number of repeating energy events (pulses) are detected (such as at least 7). Detecting potential radar events during both the first and second time periods can reduce the risk of false positives. If at 410 radar was determined to be present on the second channel, at 412 the second channel is marked unavailable.

If at 410 a determination is made that no radar signals were detected during the second time period (NO), then the events detected during the first time period are determined to have been abnormal events (such as noise, packet collisions, etc.) and not radar signals. Any buffers storing data of events detected during the first time period may also be cleared.

If at 406 no potential radar events were detected (NO), the wireless transceiver resumes normal operations on the first channel and at 402 waits for another interval before scanning the second channel. Steps 402, 404, 406, 408, 410, and 412 may be continuously repeated. For example, if radar is detected and at 412 the channel is marked unavailable, step 402 may be started again at a later time to determine whether the radar has moved (or switched to another channel).

Although methodology 400 is described with respect to two channels, those skilled in the art should readily appreciate the multiple implementations of methodology 400 can be employed for scanning multiple channels concurrently. Moreover, methodology 400 can be configured to look for different radars on different channels.

Figure 5:
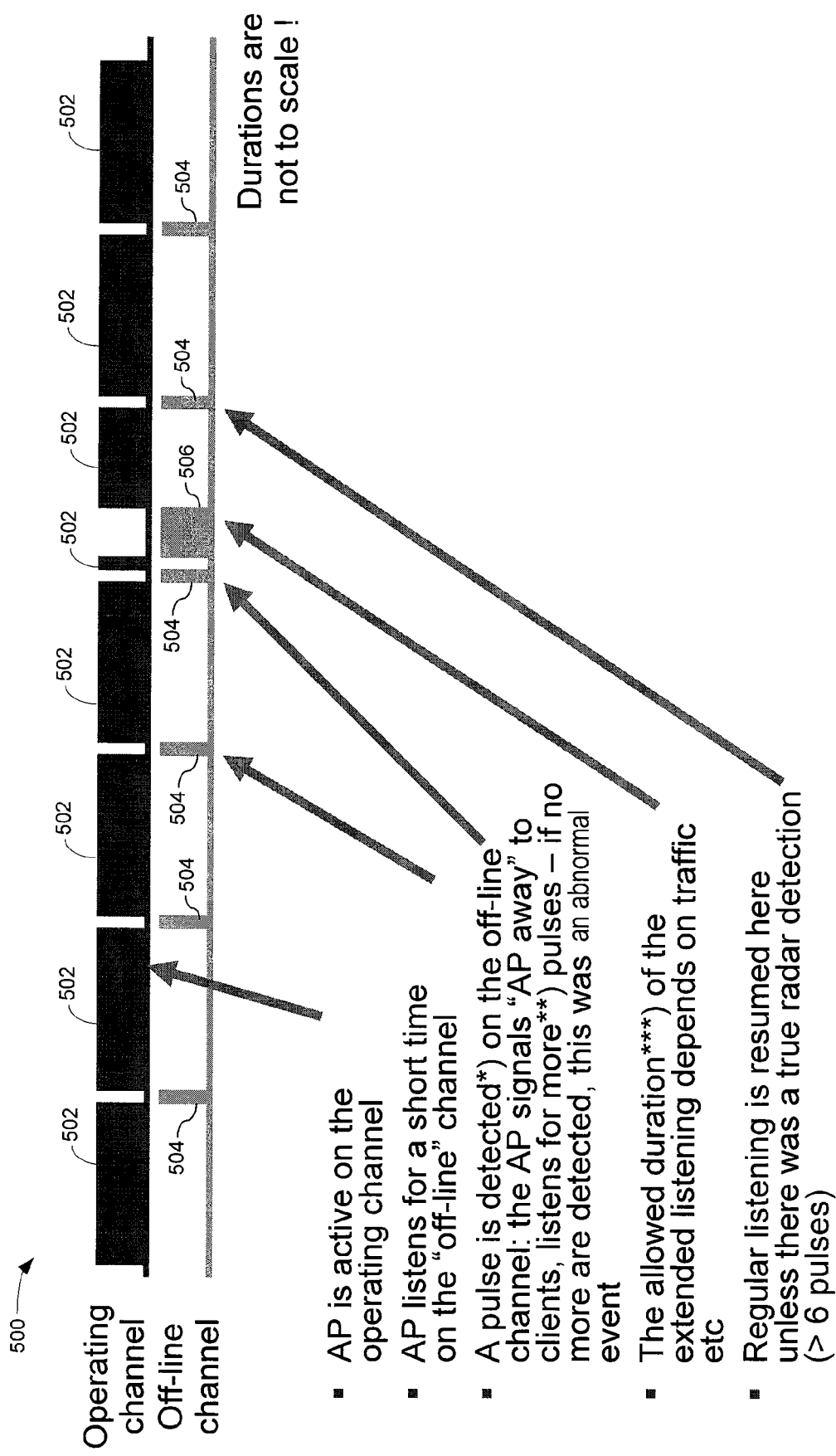
FIG. 5 illustrates an example of a signal diagram for adaptive sampling of radio frequency channels for radar detection.

FIG. 5 illustrates an example of a signal diagram 500 of an apparatus (such as an AP) and/or method employing adaptive sampling of RF channels for radar detection, as described in an example embodiment herein. Time periods represented by blocks 502 represent time periods when the wireless transceiver is operating on a first channel. The time periods represented by 504 represent time periods that the wireless transceiver is monitoring the second channel. The amount of time for time period 504 can be varied, depending upon the type of radar to be detected and/or the traffic load on the first channel. Time period 506 represents a second, longer time period that the wireless transceiver may wait responsive to detecting a potential radar event during one of the time periods 504. If radar is detected during time period 506 (for example, 6 or more pulses are detected), then the second channel can be determined to be unavailable due to the presence of radar. If radar is not detected during time period 506, then the potential radar event is determined to be an abnormal or non-radar event, and regular scanning of the second channel denoted by 504 resumes.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims, interpreted in accordance with the breadth to which they are fairly, legally, and equitably entitled.

The invention claimed is:

1. An apparatus, comprising:
    a wireless transceiver; and
    a processor coupled to the wireless transceiver;
    wherein the processor is configured to periodically switch the wireless transceiver from a first radio frequency channel to a second radio frequency channel after a predetermined interval;
    wherein the processor is configured to have the wireless transceiver dwell on the second radio frequency channel a first predetermined time period to detect energy events that are potential radar signals on the second radio frequency channel and then to switch the wireless transceiver to the first radio frequency channel; and
    wherein the processor is configured to switch the wireless transceiver to the second radio frequency channel to dwell on the second channel for a second predetermined time period responsive to detecting energy events that are potential radar signals during the first predetermined time period.

2. The apparatus of claim 1, wherein the processor is configured to determine the second radio frequency channel is unavailable due to the presence of radar responsive to detecting a predetermined number of pulses during the second predetermined time period.

3. The apparatus of claim 1, wherein the processor is configured to determined the second radio frequency channel is unavailable due to the presence of radar responsive to a sum of pulses detected during the first predetermined time period and pulses detected during the second predetermined time period being greater than a threshold.

4. The apparatus of claim 1, wherein the predetermined interval varies randomly.

5. The apparatus of claim 4, wherein the predetermined interval varies randomly for every interval.

6. The apparatus of claim 4, wherein the predetermined interval remains fixed for a certain number of intervals and varies randomly for one interval.

7. The apparatus of claim 4, wherein the predetermined interval varies by one percent.

8. The apparatus of claim 1, wherein the processor transmits a message via the wireless transceiver on the first radio frequency channel, informing associated nodes that the wireless transceiver will be off the first frequency before switching the wireless transceiver to the second frequency to dwell on the second radio frequency channel for the second predetermined time period.

9. The apparatus of claim 8, wherein the processor transmits a message via the wireless transceiver on the first radio frequency channel upon returning to the first radio frequency channel after dwelling on the second radio frequency channel for the second predetermined time period.

10. The apparatus of claim 1, wherein the processor randomly varies the first predetermined time period.

11. The apparatus of claim 1, wherein the processor is configured to generate a timestamp when energy events are detected during the first predetermined time period;
wherein the processor is further configured to determine whether a predetermined number of energy events are repeating events; and
wherein the processor determines the repeating events are potential radar signals responsive to detecting a predefined number of repeating events.

12. The apparatus of claim 11, wherein the predefined number of repeating events is three.

13. The apparatus of claim 12, wherein the processor is configured to generate a timestamp when energy events detected during the second time period;
wherein the processor is further configured to determine based on the timestamps generated during the second time period whether a second set of energy events detected during the second time period are repeating events; and
wherein the processor determines the second set of energy events are radar signals responsive to detecting a second predefined number of repeating events.

14. The apparatus of claim 13, wherein the second predefined number of repeating events is six.

15. The apparatus of claim 1, wherein one of a group consisting of the predetermined interval and the first predetermined time period are varied based on a radar signal having a minimum time for one cycle.

16. The apparatus of claim 1, wherein one of a group consisting of the predetermined interval and the first predetermined time period are varied based on a load on the first channel.

17. A method, comprising:
operating a wireless transceiver on a first frequency;
periodically switching the wireless transceiver to a second frequency after a predetermined interval and monitoring by a processor the second frequency for a first time period to detect energy events that are potential radar signals; and
monitoring by the processor the second frequency for a second time period responsive to the processor detecting a potential radar signal while monitoring the second frequency during the first time period;
wherein the second time period is greater than the first time period.

18. The method of claim 17, further comprising determining by the processor a radar signal is present on the second frequency responsive to detecting at least a predetermined number of pulses during the second time period.

19. The method of claim 17, further comprising determining by the processor a radar signal is not present on the second frequency responsive to not detecting at least a predetermined number of pulses during the second time period.

20. The method of claim 17, wherein the predetermined interval is periodically varied.

21. An apparatus, comprising:
means for operating on a first radio frequency;
means for waiting an interval;
means for switching the means for operating to a second frequency responsive to the means for waiting an interval;
means for monitoring the second frequency for a first predetermined time period;
means for monitoring the second frequency for a second predetermined time period responsive to the means for monitoring the second frequency a first predetermined time period detecting a potential radar event; and
means for determining a radar signal is present on the second frequency responsive to the means for monitoring the second frequency for a second predetermined time period detecting a radar event.

* * * * *